United States Patent
Rossi et al.

(10) Patent No.: US 8,605,177 B2
(45) Date of Patent: Dec. 10, 2013

(54) IMAGE SENSOR WITH WIDE DYNAMIC RANGE

(75) Inventors: Giuseppe Rossi, Los Angeles, CA (US); Roberto Marchesini, Santa Monica, CA (US); Qianjiang Mao, Chino Hills, CA (US); Emanuele Mandelli, Santa Monica, CA (US); Gaurang Patel, Newbury Park, CA (US); Naveen Kolli, Newbury Park, CA (US); Jonathan Stern, Thousand Oaks, CA (US)

(73) Assignee: AltaSens, Inc., Westlake Village, CA (US)

( * ) Notice: Subject to any disclaimer, the term of this patent is extended or adjusted under 35 U.S.C. 154(b) by 460 days.

(21) Appl. No.: 12/586,060

(22) Filed: Sep. 16, 2009

(65) Prior Publication Data

US 2011/0063483 A1 Mar. 17, 2011

(51) Int. Cl.
*H04N 5/335* (2011.01)
*H04N 5/228* (2006.01)
*H04N 5/235* (2006.01)

(52) U.S. Cl.
USPC .................. 348/296; 348/221.1; 348/362

(58) Field of Classification Search
USPC ............. 348/221.1, 222.1, 229.1, 230.1, 266, 348/272, 273, 294, 296, 297, 298, 362, 312
See application file for complete search history.

(56) References Cited

U.S. PATENT DOCUMENTS

| | | | |
|---|---|---|---|
| 4,584,606 A | 4/1986 | Nagasaki | |
| 5,264,940 A | 11/1993 | Komiya et al. | |
| 5,461,425 A | 10/1995 | Fowler et al. | |
| 5,892,240 A | 4/1999 | Bae et al. | |
| 6,078,037 A | 6/2000 | Booth et al. | |
| 6,456,326 B2 | 9/2002 | Fossum et al. | |
| 6,493,030 B1 | 12/2002 | Kozlowski et al. | |
| 6,504,141 B1 | 1/2003 | Kozlowski et al. | |
| 6,535,247 B1 | 3/2003 | Kozlowski et al. | |
| 6,757,019 B1 | 6/2004 | Hsieh et al. | |
| 6,924,841 B2 | 8/2005 | Jones | |
| 6,963,370 B2 | 11/2005 | DiCarllo et al. | |
| 7,046,284 B2 | 5/2006 | Kozlowski et al. | |
| 7,091,531 B2 | 8/2006 | Boemler | |
| 7,119,317 B2 | 10/2006 | Ando et al. | |
| 7,141,841 B2 | 11/2006 | Mouli | |
| 7,446,812 B2 * | 11/2008 | Ando et al. | 348/362 |
| 7,489,353 B2 * | 2/2009 | Funakoshi | 348/296 |
| 2002/0080263 A1 | 6/2002 | Krymski | |
| 2002/0110376 A1 | 8/2002 | MacLean et al. | |

(Continued)

OTHER PUBLICATIONS

C. Zhou and S. K. Nayar, "What are Good Apertures for Defocus Deblurring?," IEEE International Conference on Computational Photography, Apr. 2009.

(Continued)

*Primary Examiner* — Lin Ye
*Assistant Examiner* — Peter Chon
(74) *Attorney, Agent, or Firm* — Reed Smtih LLP

(57) ABSTRACT

An image sensor, system and method that alternates sub-sets of pixels with long exposure times and pixels with short exposure times on the same sensor to provide a sensor having improved Wide Dynamic Range (WDR). The sub-sets of pixels are reset at different time intervals after being read, which causes the respective integration times to vary. By combining information contained in the both the short and long integration pixels, the dynamic range of the sensor is improved.

28 Claims, 13 Drawing Sheets

(56) References Cited

U.S. PATENT DOCUMENTS

| | | | | |
|---|---|---|---|---|
| 2002/0175954 | A1* | 11/2002 | Pearson | 345/814 |
| 2005/0045980 | A1* | 3/2005 | Guidash | 257/432 |
| 2005/0151866 | A1 | 7/2005 | Ando et al. | |
| 2006/0011810 | A1 | 1/2006 | Ando et al. | |
| 2007/0262237 | A1 | 11/2007 | Mann | |
| 2008/0084341 | A1 | 4/2008 | Boemler | |
| 2008/0143841 | A1 | 6/2008 | Tico et al. | |
| 2008/0198251 | A1 | 8/2008 | Xu | |
| 2008/0218602 | A1 | 9/2008 | Kozlowski | |
| 2010/0002094 | A1* | 1/2010 | Solhusvik et al. | 348/230.1 |
| 2010/0238328 | A1* | 9/2010 | Pillman et al. | 348/241 |

OTHER PUBLICATIONS

Kavusi, S. Ghosh, K. and Abbas El Gamal, "Architectures for High Dynamic Range, High Speed Image Sensor Readout Circuits" 2006 IFIP International Conference on Very Large Scale Integration, pp. 36-41, Oct. 16-18, 2006.

Nayar, S.K. Mitsunaga, T., "High dynamic range imaging: spatially varying pixel exposures," IEEE Conference on Computer Vision and Pattern Recognition, vol. 1, pp. 472-479, Jun. 2000, ISBN: 0-7695-0662-3.

Shree K. Nayar, Vlad Branzoi, "Adaptive Dynamic Range Imaging: Optical Control of Pixel Exposures Over Space and Time," iccv, vol. 2, pp. 1168, Ninth IEEE International Conference on Computer Vision (ICCV'03)—vol. 2, 2003.

Narasimhan, S.G. and Nayar, S.K., "Enhancing resolution along multiple imaging dimensions using assorted pixels." IEEE Transactions on Pattern Analysis and Machine Intelligence, vol. 27, Issue 4, pp. 518-530, Apr. 2005.

X. Liu and A. El Gamal, "*Synthesis of High Dynamic Range Motion Blur Free Image from Multiple Captures*," IEEE Transactions on Circuits and Systems I: Fundamental Theory and Applications, vol. 50, No. 4, pp. 530-539, Apr. 2003.

B. Wandell, P. Catrysse, J. DiCarlo, D. Yang, and A. El Gamal, "*Multiple Capture Single Image Architecture with a CMOS Sensor*," Proceedings of the International Symposium on Multispectral Imaging and Color Reproduction for Digital Archives, Chiba, Japan, pp. 11-17, Oct. 21-22, 1999.

A. El Gamal, *High-Dynamic-Range Image Sensors*, tutorial presented at *IEEE Int. Solid State Circuits Conf.*, Feb. 2002.

H. Nagahara, S. Kuthirummal, C, Zhou, and S.K. Nayar, "*Flexible Depth of Field Photography*," European Conference on Computer Vision (ECCV), Oct. 2008.

"Characterization of Charge-Coupled Device Line and Area-Array Imaging at Low Light Levels", M.H. White, D.R. Lampe, I.A. Mack and F.C. Blaha, 1973 IEEE International Solid-State Circuits Conference, pp. 134, 135, 208 and 209.

"PASIC. A Smart Sensor for Computer Vision" Keping Chen, Anders Astrom and Per-Erik Danielsson, 1990 IEEE, pp. 286-291.

"Wide Intrascene Dynamic Range CMOS APS Using Dual Sampling" Orly Yadid-Pecht, 1997 IEEE Transactions on Electron Devices, vol. 44, No. 10, pp. 1721, 1722 and 1723.

Extended European Search Report, May 17, 2013.

\* cited by examiner

FIG. 2

IMAGE SENSOR WITH WIDE DYNAMIC RANGE

BACKGROUND OF THE INVENTION

1. Field of the Invention

The present invention relates generally to CMOS image sensors, and more particularly to a sensor, system and method for utilizing pixels with long exposure times and pixels with short exposure times on the same sensor to provide a sensor with a wide dynamic range.

2. Description of the Related Art

In digital photography, rarely are the lighting conditions ideal. The scene to be photographed may be too dark, too light, too diverse, or too dynamic, such as when a cloud quickly blocks the sun. In order to adjust to different lighting conditions, an image sensor needs to have a wide dynamic range. That is, the sensor should be able to adjust to the current lighting conditions to maximize the details in the image, and thereby produce the best possible picture.

Many scenes contain useful information in both shadow and bright areas which are traditionally very difficult to image at the same time. A recurring prior art solution is to take multiple images of the same scene using different exposure times. For example, as discussed in A. El Gamal, *High-Dynamic-Range Image Sensors*, tutorial presented at *IEEE Int. Solid State Circuits Conf.*, February 2002., a sensor could take three pictures—one with a short exposure time, one with a medium exposure time, and one with a long exposure time. Another example is disclosed in U.S. Pat. No. 5,264,940 by Komiya, which also describes the benefit of accumulating an image more than once using different exposures. Certain features in the scene which may be overexposed in the long exposure frame are visible in the short exposure image. Similarly, scene features which are too dark, or not visible at all, in the short exposure image, are visible as a result of the longer exposure time. The images may be combined using image processing techniques to produce a processed image that contains more visual details than any of the single images alone. However, a drawback to such an approach is that the processed images often contain motion artifacts caused by movement in the scene between the different exposures. Another major drawback is that the different exposures are taken at different times and can thus wholly represent different images. U.S. Pat. No. 4,584,606 disclosed the use of multiple sensors to simultaneously accumulate the different exposures at generally the same moment in time.

Another solution is described in Nayar, S. K. Mitsunaga, T., "High dynamic range imaging: spatially varying pixel exposures," IEEE Conference on Computer Vision and Pattern Recognition, Vol. 1, pp. 472-479, June 2000. ISBN: 0-7695-0662-3. According to this approach, an array of neutral density filters with different opacity are deposited on a sensor so that pixels with darker filters sample brighter portions of a scene, while pixels with lighter filters capture lower light features (see FIG. 1). The information can be combined using low pass filtering or techniques such as cubic interpolation. The problem with such a solution is that the dynamic range of the sensor is effectively fixed by the selected filters and filter pattern, regardless whether the selected filter pattern also includes a color structure, such as Bayer filter matrix, or is monochromatic with a structure having alternating optical transmittance.

SUMMARY OF THE INVENTION

In general, the present invention is an image sensor, system and method for utilizing pixels with long exposure times and pixels with short exposure times on the same sensor to provide a sensor having improved Wide Dynamic Range (WDR).

According to one embodiment of the invention, an image sensor comprises a plurality of pixel rows, each row comprising a plurality of pixels; a first signal line connected to a first sub-set of pixels in a row; a second signal line connected to a second sub-set of pixels in a row; and a signal read out and reset timing controller connected to the first and second sub-set of pixels via the first and second signal lines, respectively, wherein the controller controls the read out of pixel signals such that signals from the first sub-set of pixels are read out during a first time period, and signals from the second sub-set of pixels are read out during a second time period; and wherein the controller resets the pixels in the first sub-set of pixels in a row at a first time interval, and resets the pixels in the second sub-set of pixels at a second time interval. The second sub-set of pixels is reset before the first sub-set of pixels such that the second sub-set of pixels has a longer integration time than the first sub-set of pixels. Alternately, the second sub-set of pixels can be reset at the same time as the first sub-set of pixels, while having started its integration epoch at a different time than the first sub-set of pixels thereby having either a longer or shorter integration time. The first and second sub-set of pixels in each row may be formed in an alternating pattern across each row of pixels in the image sensor. The first and second sub-set of pixels are formed as N×M blocks of pixels, which alternate and repeat across at least a portion of the image sensor. In a preferred embodiment, the first and second sub-set of pixels are formed as alternating Red and Green two pixel sets in a first row, and alternating Green and Blue two pixel sets in a second row. Utilizing a preferred 2×2 block, the 2×2 block comprises one Red, two Green and one Blue pixel, wherein the 2×2 block is repeated across the entire sensor. Preferably, the 2×2 blocks of first sub-set pixels and second sub-set pixels alternate, such that no two 2×2 blocks of first sub-set pixels are located orthogonally next to another 2×2 block of first sub-set pixels. The signal read out and reset timing controller may comprise a first programmable integration time controller to set the first time interval, and a second programmable integration time controller to set the second time interval. The first and second time intervals are adjusted by the controller to set a desired dynamic range of the image sensor.

In an alternate embodiment, the signal read out and reset timing controller adds additional row read out delay time at the end of each frame, in order to thereby increase the second time interval beyond a normal time required to read one frame without physically increasing the size of the image sensor (i.e. the controller processes "phantom" rows).

In another embodiment, an image sensor comprises a plurality of pixel rows, each row comprising a plurality of pixels, a plurality of first signal lines equal to a number of pixels rows in the sensor, wherein each first signal line is connected to a first sub-set of pixels in one row of pixels; a plurality of second signal lines equal to the number of pixel rows in the sensor, wherein each second signal line is connected to a second sub-set of pixels in one row of pixels; and a timing controller connected to the plurality of first and second signal lines to control the read out of pixels on a row-by-row basis, wherein the first sub-set of pixels in a respective row is read out at a first time period, and the second sub-set of pixels is read out at a second time period following the first time period and before a next row is read out, and wherein the timing controller resets the pixels in the first sub-set of pixels in a respective row at a first integration start time interval and resets the second sub-set of pixels in a respective row at a second integration start time interval. The second sub-set of pixels is reset before the first sub-set of pixels such that the second sub-set of pixels has a longer integration time than the first sub-set of pixels. Alternately, the second sub-set of pixels can be reset at the same time as the first sub-set of pixels, while having started its integration epoch at a different time than the first sub-set of pixels thereby having either a longer or shorter integration time.

The first and second sub-set of pixels in each row may be formed in an alternating pattern across each row of pixels in the image sensor. Preferably, the first and second sub-set of pixels are formed as N×M blocks of pixels, which alternate and repeat across at least a portion of the image sensor. The sensor may further comprise a color filter array formed over the pixels, wherein the first and second sub-set of pixels are formed as alternating Red and Green two pixel sets in a first row, and alternating Green and Blue two pixel sets in a second row. In a preferred embodiment, a 2×2 block of color filters formed over the pixels in the sensor, the 2×2 block of color filters comprising one Red, two Green and one Blue pixel, wherein the 2×2 block is repeated across the entire sensor. The sensor may comprise alternating 2×2 blocks of first sub-set pixels and second sub-set pixels, such that no two 2×2 blocks of first sub-set pixels are orthogonal to another 2×2 block of first sub-set pixels. The timing controller may include a first programmable integration time controller to set the first integration start time interval, and a second programmable integration time controller to set the second integration start time interval.

In addition, the timing controller may add additional row read out delay time at the end of each frame, in order to increase the second time interval beyond a normal time required to read one frame. In another embodiment, the timing controller only reads out only one of the first and second sub-set of pixels to create a low resolution image. In an alternate embodiment, the timing controller reads out both the first and second sub-set of pixels for only a portion of the image sensor to create a higher resolution image portion in an image.

In another embodiment, color filters are not employed. Instead the monochrome sensor generates a wide dynamic range image of a monochromatic scene. Color images can be formed by optically combining multiple sensors using various approaches, such as taught by U.S. Pat. No. 4,584,606 (Nagasaki), or other standard techniques such as the use of prisms with a sensor at each image-forming facet.

The present invention includes a method for increasing the dynamic range of an image sensor, the image sensor comprising a plurality of pixel rows, each pixel row comprising a plurality of pixels, the method comprising reading out a first sub-set of pixels in a first row during a first time period; reading out a second sub-set of pixels in the first row during a second time period, but before reading pixels from a next row; resetting the pixels in the first sub-set of pixels after a first integration start time interval X; and resetting the pixels in the second subset of pixels after a second integration start time interval Y. The method preferably comprises resetting the first sub-set of pixels initially after reading, and resetting the second sub-set of pixels initially after reading. In one embodiment, the first integration start time interval X is equal to a time period to read out X rows of the sensor and the second integration start time interval Y is equal to a time period to read out Y rows of the sensor. In one embodiment, X is greater than Y, such that the second sub-set of pixels has a longer signal integration time than the first sub-set of pixels. In another embodiment, Y is great than X, such that the first sub-set of pixels has a longer signal integration time than the second sub-set of pixels. In an alternate embodiment, either X or Y is equal to a time period greater than a time required to read out all rows in the image sensor, such that an integration time for pixels is greater than a normal frame period. The method preferably includes processing the pixel signals from the first and second sub-set of pixels from each row in the image sensor to form a single image.

An image sensor system according to an embodiment of the invention comprises a plurality of pixel rows, each row comprising a plurality of pixels, a plurality of first signal lines equal to a number of pixels rows in the sensor, wherein each first signal line is connected to a first sub-set of pixels in one row of pixels; a plurality of second signal lines equal to the number of pixel rows in the sensor, wherein each second signal line is connected to a second sub-set of pixels in one row of pixels; a timing controller connected to the plurality of first and second signal lines to control the read out of pixel signals on a row-by-row basis, wherein the first sub-set of pixels in a respective row is read out at a first time period, and the second sub-set of pixels is read out at a second time period following the first time period and before a next row is read out, and wherein the timing-controller resets the pixels in the first sub-set of pixels in a respective row at a first integration start time interval and resets the second sub-set of pixels in a respective row at a second integration start time interval; and an image processor to combine the pixel signals from the first and second sub-set of pixels.

BRIEF DESCRIPTION OF THE DRAWINGS

The present invention will be readily understood by the following detailed description in conjunction with the accompanying drawings, wherein like reference numerals designate like structural elements, and in which:

FIG. 2 illustrates a unique checkboard pattern of pixels having different integration times according to one embodiment of the present invention;

DETAILED DESCRIPTION OF THE INVENTION

Figure 1:
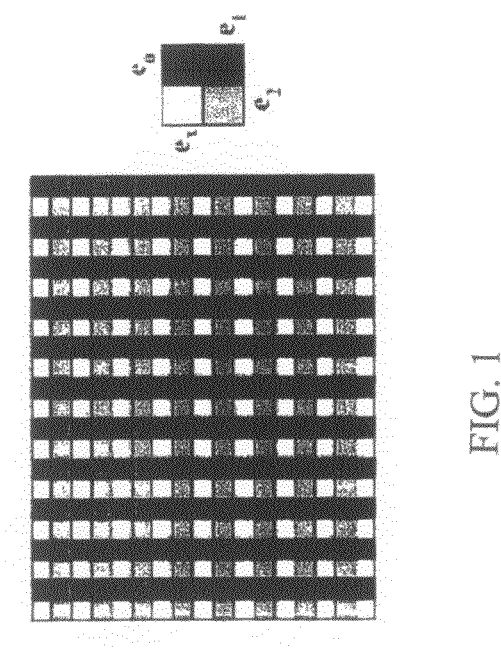
FIG. 1 shows a prior art sensor having fixed neutral density filters.

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

According to the present invention, a unique checkerboard pattern of filters is deposited on an image sensor, wherein different sub-blocks of pixels have different integration times. Since the integration times can be programmably varied, the dynamic range of the sensor can be continuously adjusted. Moreover, since the long and short exposure times are combined in a single contiguous frame of the full image sensor, there are only negligible motion artifacts, compared to prior art WDR images.

Figure 2:
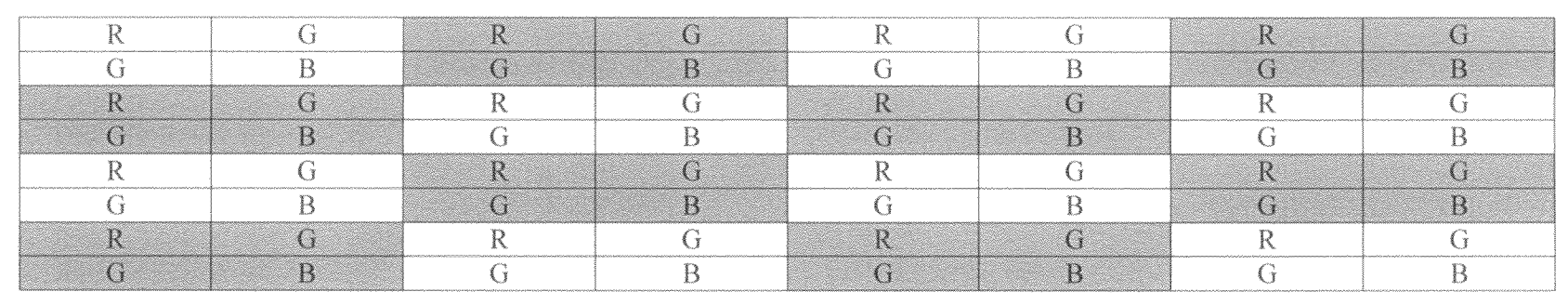

For example, as shown in FIG. 2, alternating sub-blocks of a red, two green, and a blue pixel are formed. Half of the sub-blocks (white boxes) are triggered for a long exposure time, and the alternating half of sub-blocks (gray boxes) are triggered for a short exposure time. This results in an orthogonal checkerboard pattern of light exposure and dark exposure areas wherein each sub-block is also a self-contained resolution block. By capturing long exposure and short exposure pixels within the same frame, the sensor is capable of capturing a wide dynamic range with a minimum of motion artifacts and outputs wide dynamic range information whose resolution is largely uncompromised relative to standard sensors and other WDR sensors. While in the first two rows of FIG. 2, a long integration block of pixels is followed by a short integration block, the respective position of the long and short blocks may be reversed—the point is to have contiguous sub-blocks of pixels with alternating long and short integration times from sub-block to sub-block within each frame.

The exposure of each of the two groups of pixels is controlled by the pixel integration time, which can be programmed with high accuracy and reproducibility. Moreover, the wide dynamic range enhancement features can be easily turned on, turned off, or dynamically reprogrammed to various cyclic timing periods as needed.

In a preferred embodiment, the present invention is implemented with a 2×2 shared pixel architecture, as disclosed in co-pending application Ser. No. 11/969,303, entitled TWO-BY-TWO PIXEL STRUCTURE IN AN IMAGING SYSTEM-ON-CHIP, filed Jan. 5, 2008, the disclosure of which is herein incorporated by reference. Incorporating the present invention into an image sensor having a 2×2 shared architecture does not require any new elements to be introduced into the pixel array. The only additional functionality required is to modify the sensor's time controller to control two or more integration periods while synchronizing the row read-out. Since this is an all-digital change, there is no adverse impact on the performance of the pixel array. Consequently, all performance levels normally available in non-WDR modes of operation are readily achieved when the WDR mode is utilized. As can be appreciated by one of skill in the art, the timing controller in imaging system-on-chip sensors transmits the various reset pulses setting the integration time by appropriately stimulating, for example, either the gate of the reset transistor, a transmit (TX) transistor, or other such control transistor, depending on the specific pixel circuit used in the image sensor.

In the preferred embodiment, TX gates facilitate this control in a sensor having an architecture built with shared pixels. For regular, unshared pixel architectures, an additional wire is necessary to independently control two separate sets of the TX pulses. For relatively large-sized pixels (roughly >4 µm pitch, depending on process lithography), no loss of quantum efficiency results from this addition.

For ease of description, it is best to think of each physical row of pixels as composed by two distinctive half-rows of pixels, orthogonally interleaved to each other from sub-block to sub-block (FIG. 2). Each half-row comprising the pixels from alternating sub-blocks is read-out during a distinctive epoch of time, where each epoch is called a half-line since half of the pixels are accessed. To read out a physical row two half-line epochs are required—one after the other. For an imager with N rows, there will be 2×N half lines.

It is also convenient to consider odd half-lines and even half-lines as forming two distinctive groups. Each half line group (odd/even) may be controlled by its own integration time controller. A WDR imager according to the present invention with N rows of pixels is controlled substantially similar to a regular imager composed by 2×N half-lines, with the difference that each set of half-lines (odd/even) has its own independently programmable integration time controller. All the same time rules applicable to regular imagers are also applicable to the WDR imagers of the present invention, provided that each row is replaced by two half lines.

Figure 3:
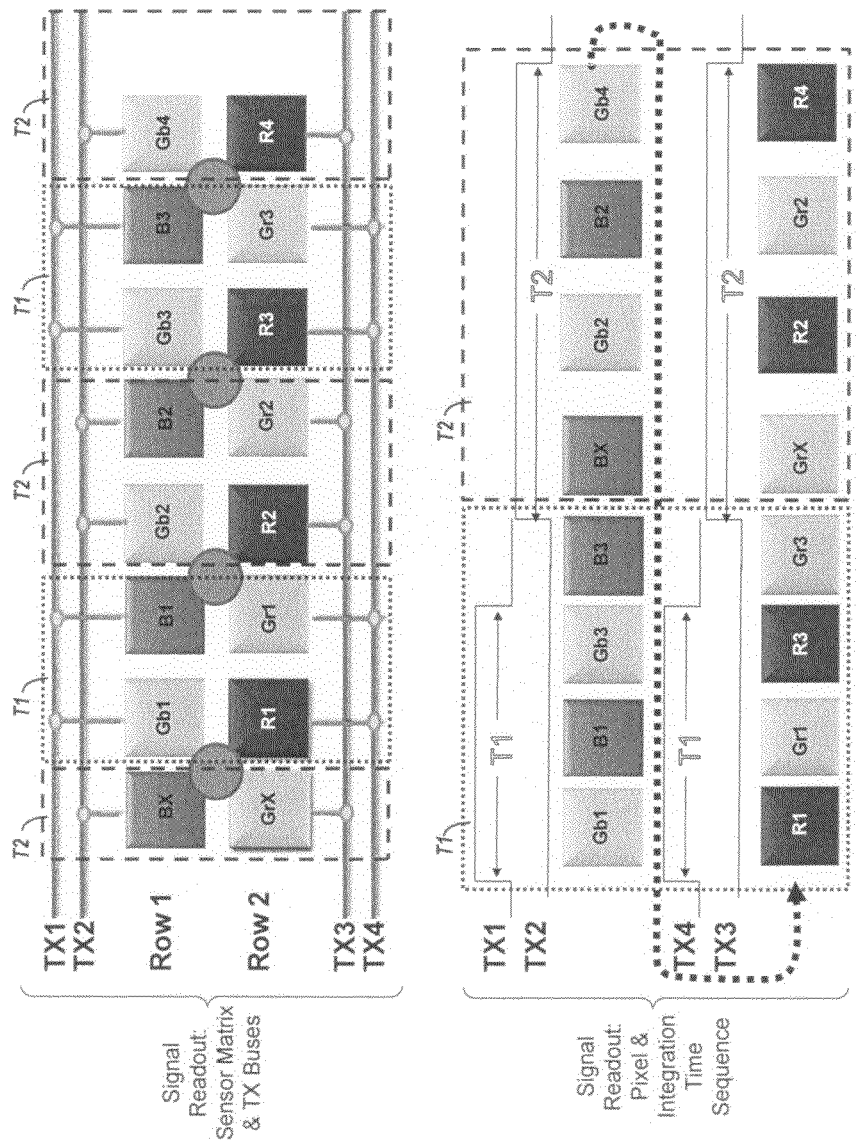
FIG. 3 illustrates a read-out scheme for the image sensor of FIG. 2.

A read-out operation of a WDR image sensor of the present invention is illustrated in FIG. 3. Shown for purposes of clarity at the top of the figure is a 2 row by 8 column "subarray" even though the actual array comprises many of the these sub-arrays. The pixels within the boxes denoted as T1 integrate for integration time T1; pixels within the T2 boxes integrate for a separate T2 period. Shown at the bottom of the figure is the pixel readout and integration time ordering along with corresponding T1 and T2 integration epochs. Each row consists of two half-rows (serviced by TX1/TX2 buses for Row 1 and TX3/TX4 buses for Row 2). Pixels labelled beginning with a "G" are green, "B" are blue, and "R" are red.

Although not constrained to generally be the case, both the T1 and T2 integration epochs conclude at the same time for basic illustration. We hence begin the readout process and a specific readout interval just as T1 and T2 conclude.

At the conclusion of integration time epoch T1, pixels Gb1, B1, Gb3, and B3 are read out as controlled by line TX1. Simultaneously, bus TX4 triggers readout of pixels R1, Gr1, R3 and Gr3. As the second time epoch T2 is concluding, pixels BX, Gb2, B2 and Gb4 are read after being triggered by line TX2 while GrX, R2, Gr2 and R4 are triggered by line TX3. The pixels comprising two integration epochs, T1 and T2, are hence read out in the order of Gb1, B1, Gb3, B3, BX, Gb2, B2, Gb4, R1, Gr1, R3, Gr3, GrX, R2, Gr2, and R4. These signals are subsequently constituted either on-chip or in the downstream electronics to produce a set of color pixels via color demosaicing using the data from both the long and short integration epochs.

As illustrated in the bottom half of the figure, the short integration set of pixels are read out first, but it is also possible to read out the long integration set of pixels first. Also, as noted above, the checkerboard pattern can start with either long or short integration pixels.

Figure 4:
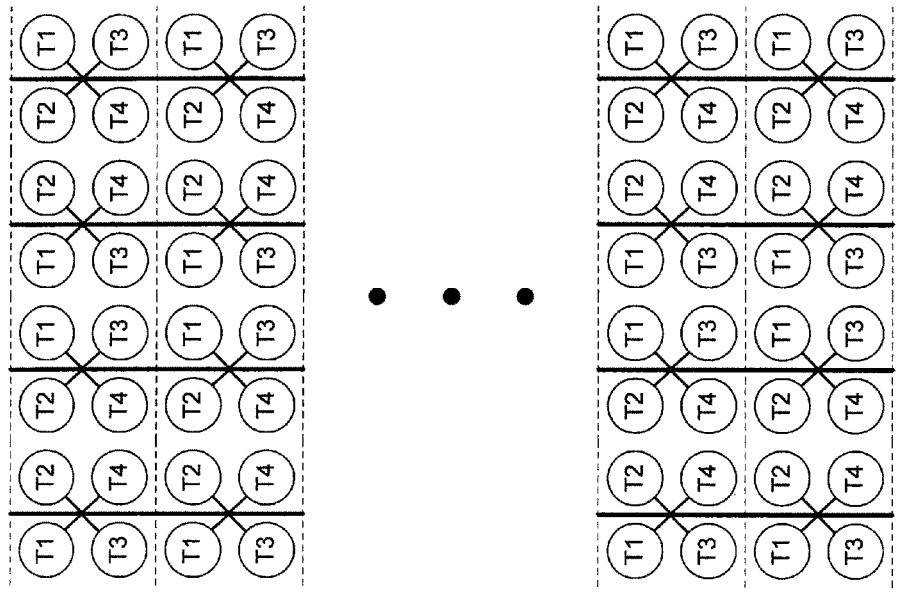
FIG. 4 shows the read-out architecture in further detail.
Figure 4:
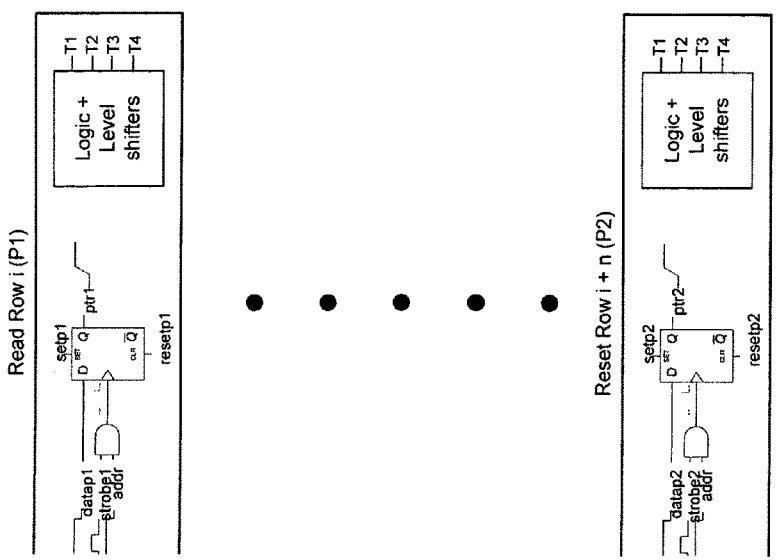

The read-out structure is further illustrated in FIG. 4. While one half row is being read out, another half-row is being reset in a rolling shutter fashion. To control integration time in WDR imagers using electronic shutter operations and rolling shutter timing, two timing "pointers" per half line are required, that is four pointers per physical rows are required rather than the customary two pointers per physical rows used in the non-WDR architecture.

More specifically, in order to control and vary the integration time, each set of half rows (odd and even) are reset according to a different time controller. For the short integration time half-rows, the rolling reset operation will reset a row just shortly before it is read, whereas for the longer integration time half-rows, the reset operation will occur at a time before an associated short integration half row is reset. This results in the pixels in the longer integration half rows to have a longer integration time between being reset and being readout. The timing controller can be programmed independently for each set of half rows to accordingly compensate the relative integration times.

Figure 9A:
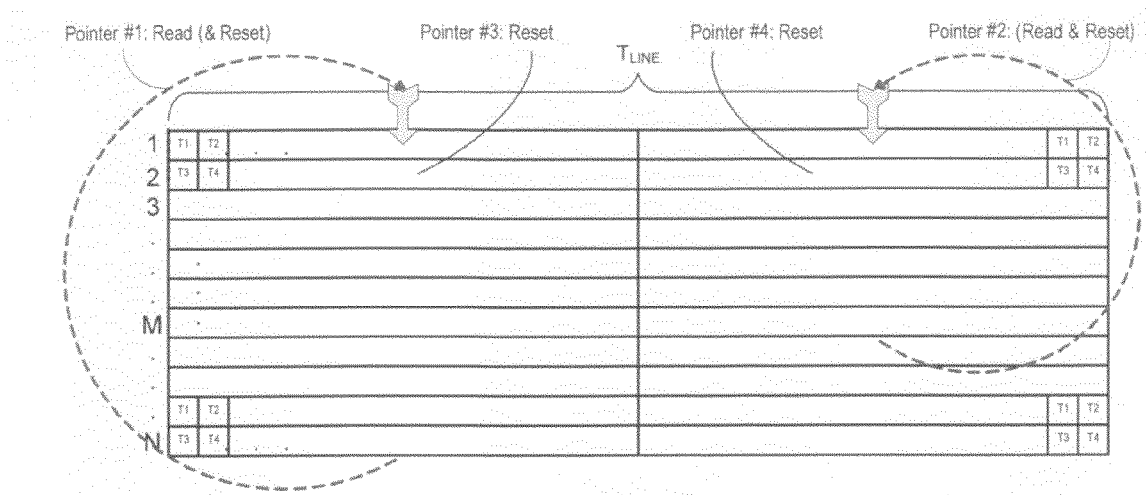
FIG. 9A is an illustration of the different reset timing between long and short integration sub-sets of pixels.

This procedure is illustrated in FIG. 9A, wherein the checkerboard interleaving of pixel sub-sets is separated for purpose of clarity. During a first time period occurring within the line time $T_{LINE}$, the first half row of Row 1 is read, and is preferably reset after being read via Pointer 1. Then during a next time period, which is also within time $T_{LINE}$, the second half row of Row 1 is read and reset via Pointer 2. Each row is similarly read out and reset by these first two pointers. A separate timing pointer is thus utilized to keep track of the read timing for each half row, so a set of two timing pointers, #1 and #2, are used per physical row.

Figure 9B:
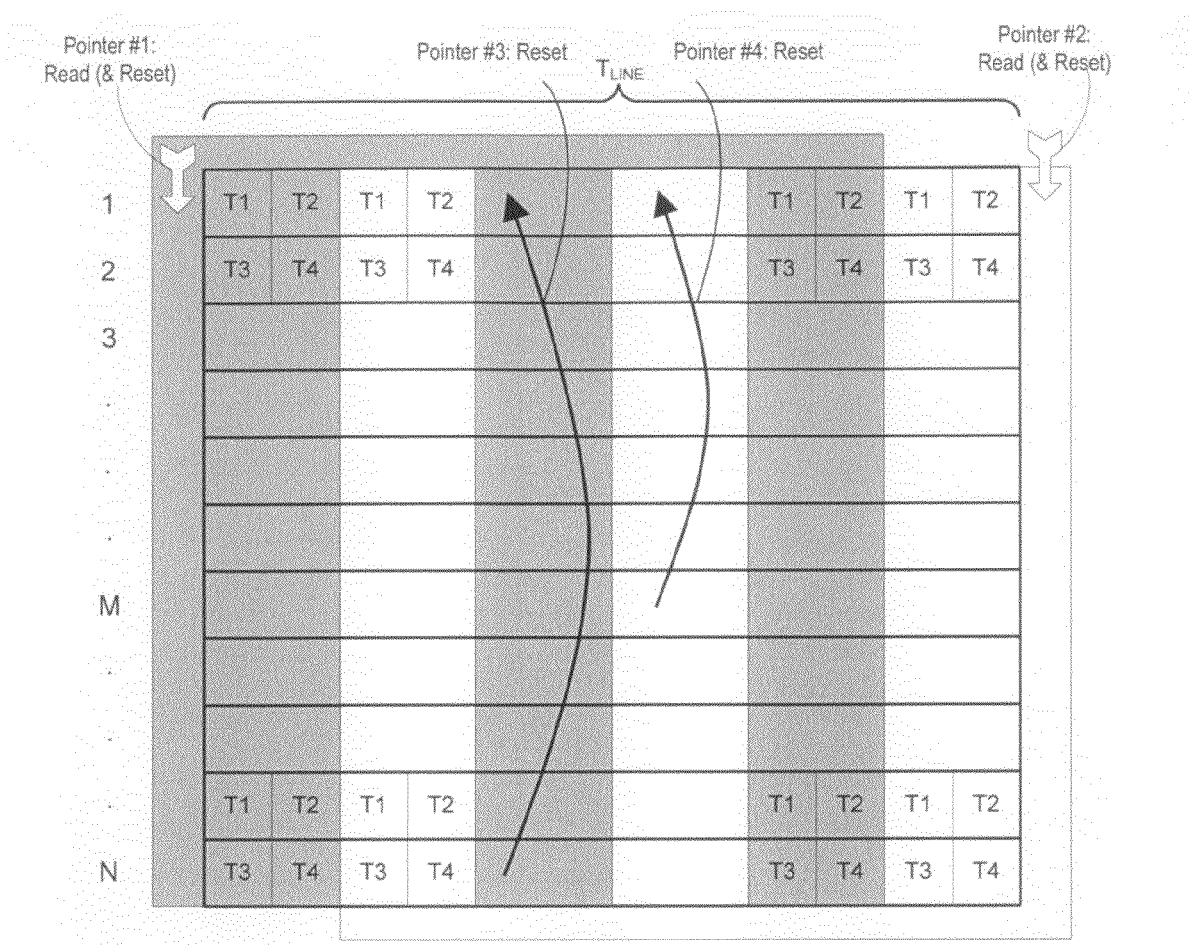
FIG. 9B is an illustration of the different reset timing between long and short integration sub-sets of pixels in an interleaved array.
Figure 9C:
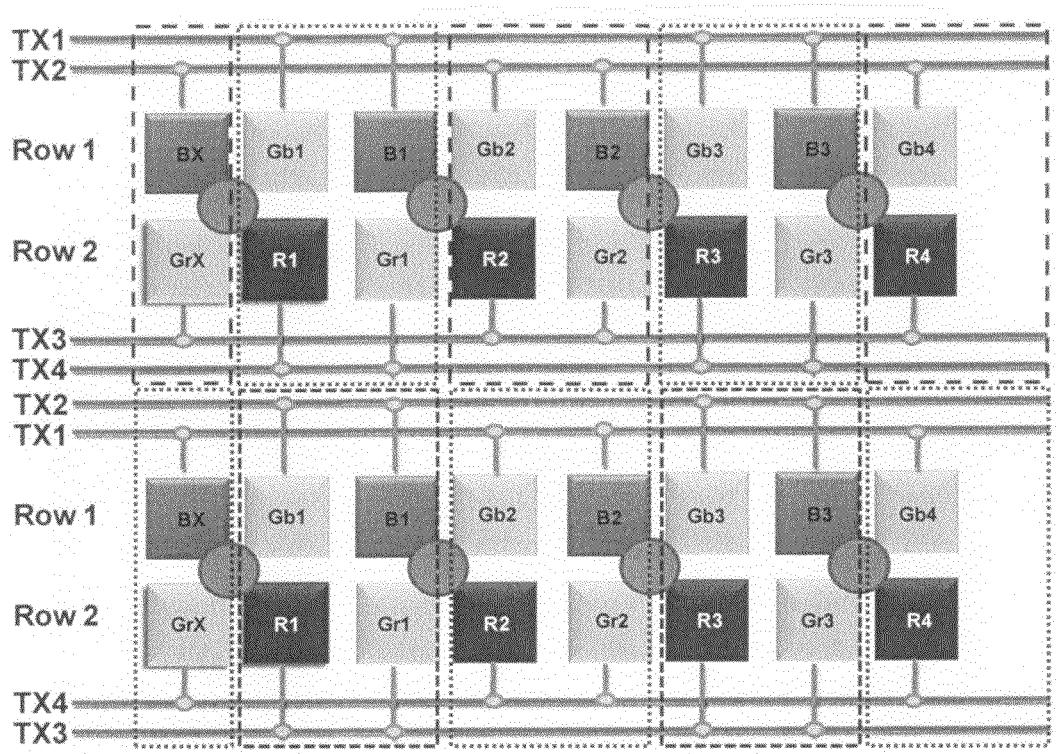
FIG. 9C is an illustration of the bus connections required for configuring a checkerboard array with long and short integration sub-sets of pixels.

At a later time, Row M is read. When the first half row of Row M is read out, the first half row of Row (M-X) is reset. Similarly, when Row N is read out, the first half row of Row (N-Y) is reset. In order to keep track of the two different reset times (X and Y), two additional, timing "pointers" (pointer #3 and #4) are used for a total of four per array. By adjusting the values of X and Y, the relative integration times for each half row can be modified. Normally, the values of X and Y are equal to a time period to read out a certain number of rows. In this embodiment, the maximum value for the longest integration time would therefore be equal to the time to readout an entire frame (# of Rows×$T_{LINE}$). The shortest integration time would be the time ($T_{LINE}$) to read out one row. FIG. 9B reconstitutes FIG. 9A as an interleaved sensor without a full checkerboard. Final reconstitution for the preferred checkerboard embodiment entails the bus connections shown in FIG. 9C.

Figure 10:
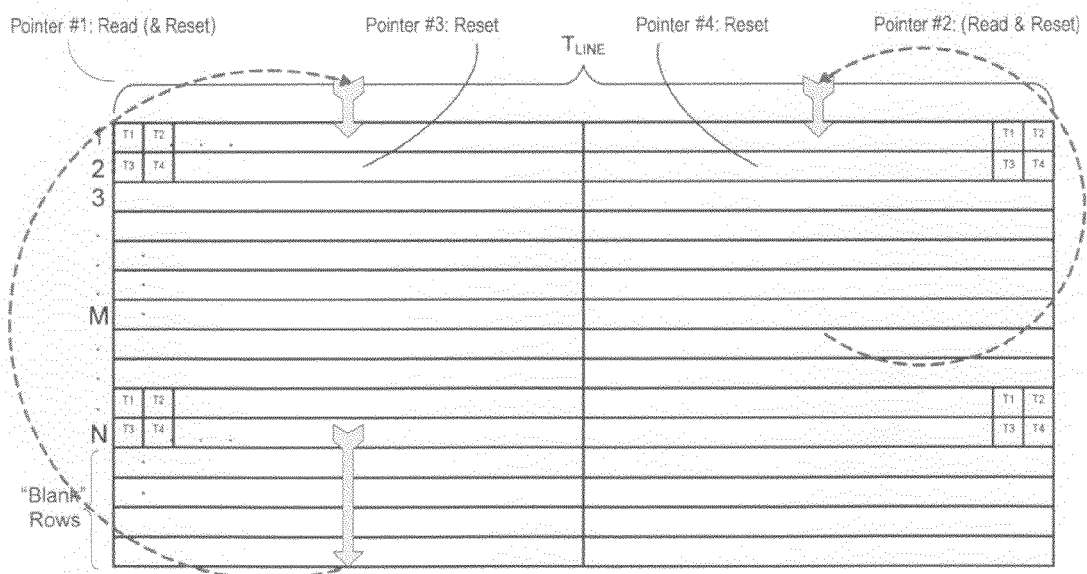
FIG. 10 illustrates the concept of adding "blank" rows to an image frame in order to increase the length of the long integration period.

For certain applications, such as video security cameras, it may be desirable to increase the relative ratio of short integration time to long integration time. An alternative embodiment to accomplish this is illustrated in FIG. 10. "Blank" or phantom rows are effectively added to the sensor array, such that additional time can be added to the long integration time. The additional integration time can be used to create a greater difference between the short and long integration time. In addition, the additional rows can be "read" (i.e. do nothing) during the frame blanking interval thus the over-all sensor frame timing is not affected. In practice, additional rows are not actually added, but the timing controller just runs for an additional period of time at the end of each frame.

An additional advantage of the present architecture is that the WDR functionality can be turned out for only a portion of the image array. In other words, in a "normal" mode the image sensor could read only the short integration pixels or only the long integration pixels in each row to produce a lower resolution image. When greater resolution is desired, the additional half row of pixels in some sub-set of the array can then be read out, thereby creating a higher resolution sub-image in an area of interest. Such an embodiment could be useful in situations where it is desirable to store less data, but have the capability of enhancing an image based on observed features.

Figure 6:
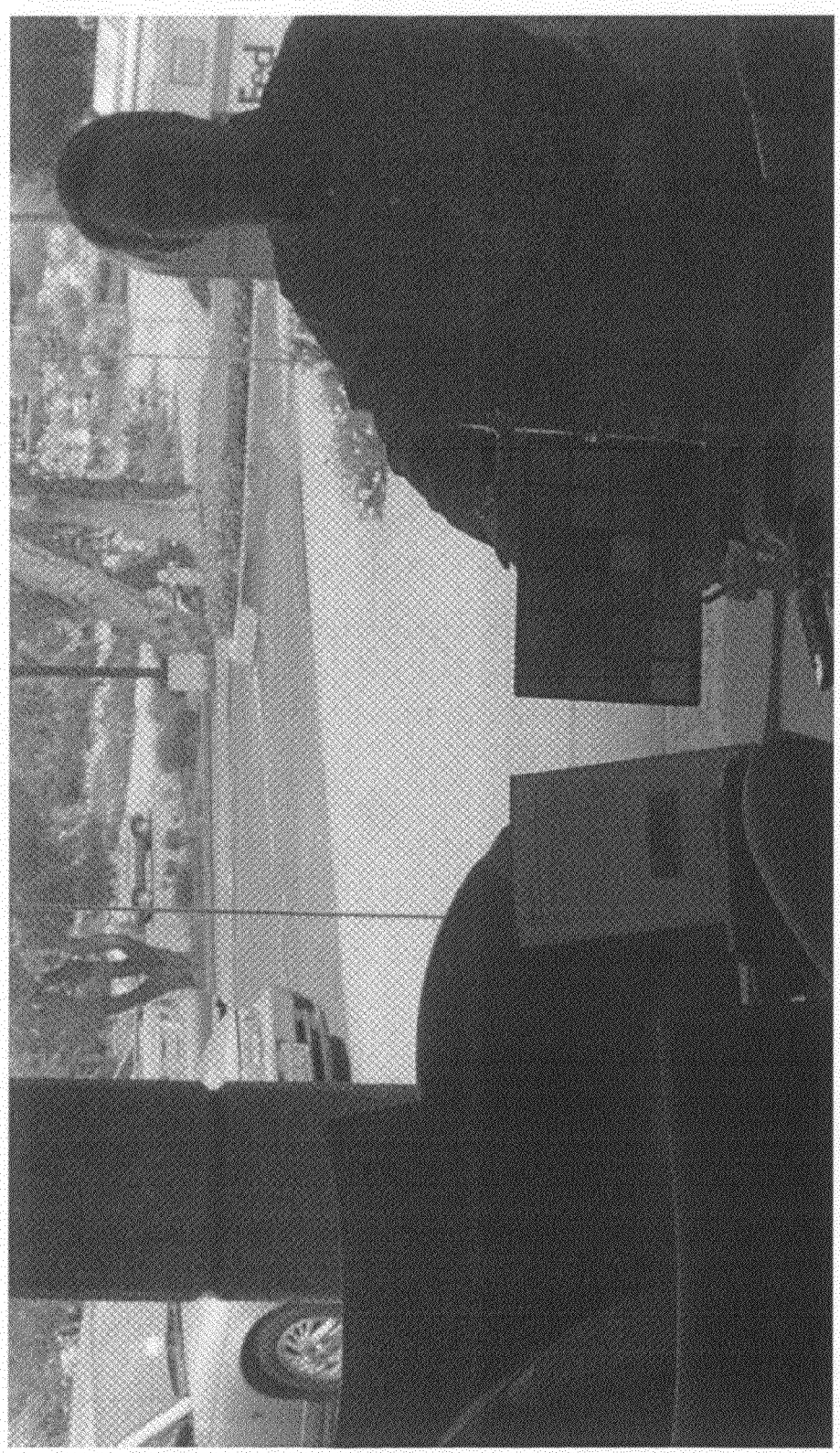
FIG. 6 is a sample photograph taken with an image sensor designed according to the present invention.
Figure 7:
FIG. 7 shows a magnified view of a photograph taken with an image sensor designed according to the present invention.
Figure 8:
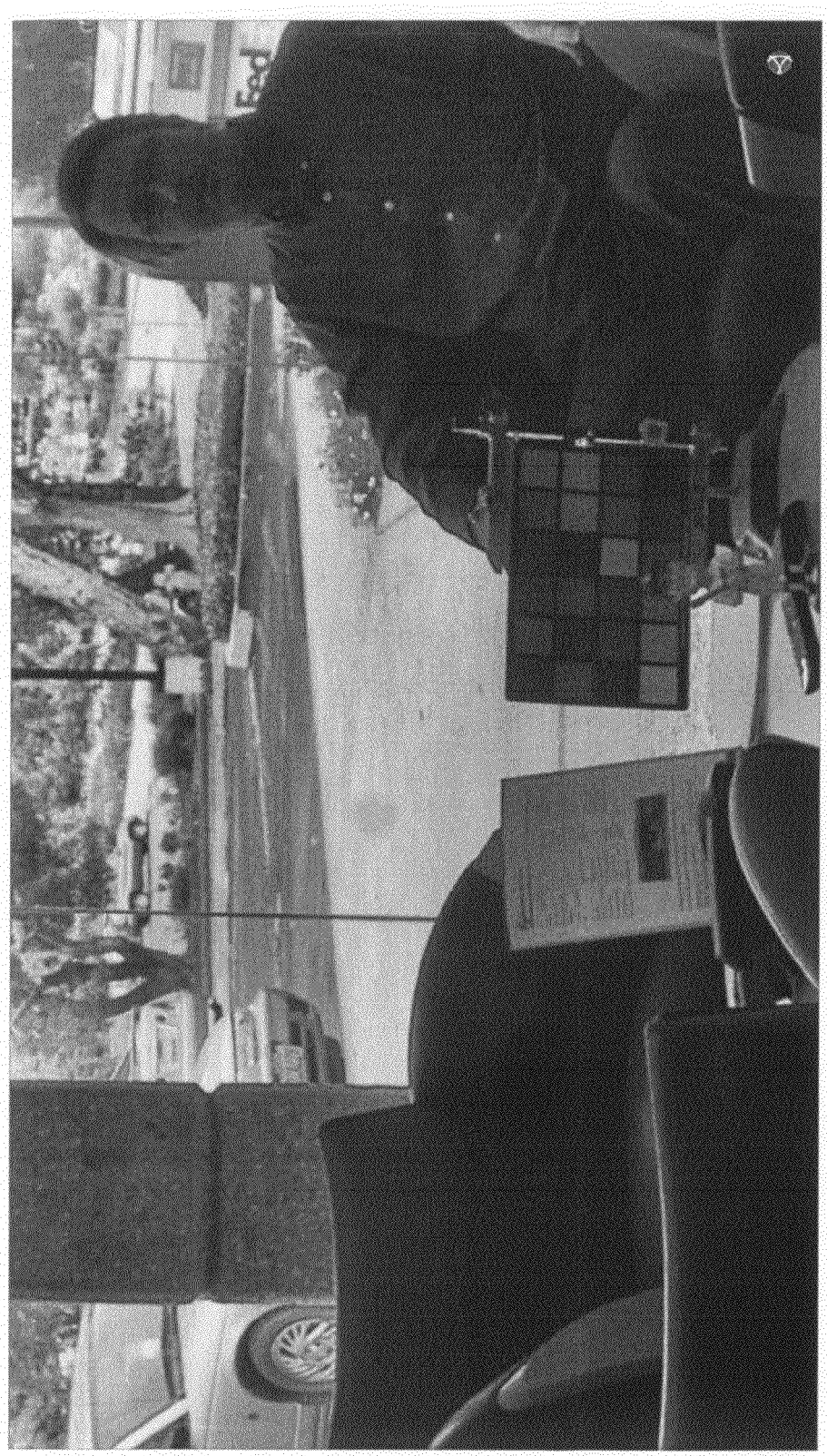
FIG. 8 is the photograph of FIG. 6, after digital image processing has been applied to the raw image file.

As implemented, the novel structure of the present WDR image sensor allows scenes having contrasting bright and dark areas to be imaged in a single frame. For example, FIG. 6 is a sample photograph taken with an image sensor designed according to the present invention. Note how the scene is dark in the foreground and bright in the background. FIG. 7 shows a magnified view of a photograph taken with an image sensor designed according to the present invention. The different sub-pixel groups produced a checkeboard pattern of light and dark blocks, based on the integration time of the underlying sub-block. Finally, FIG. 8 is the photograph of FIG. 6, after digital image processing has been applied to the raw image file. The digital processing entails adding the short integration time data to the long integration time data for each pixel and subsequently demosaicing (in the case of a WDR sensor with color filter array) the resulting enhanced data from each pixel, i.e., wide dynamic range, to produce a full color WDR image. In the absence of a color filter array a monochrome WDR image is generated. Note how the foreground scene, which previously looked dark, is now visible. Similarly, the background scene, which previously appears too bright, is also clearly visible.

In another embodiment, color filters are not employed. Instead the monochrome sensor generates a wide dynamic range image of a monochromatic scene. Color images can be formed by optically combining multiple sensors using various approaches, such as taught by U.S. Pat. No. 4,584,606 (Nagasaki), or other standard techniques such as the use of prisms with a sensor at each image-forming facet.

Figure 5:
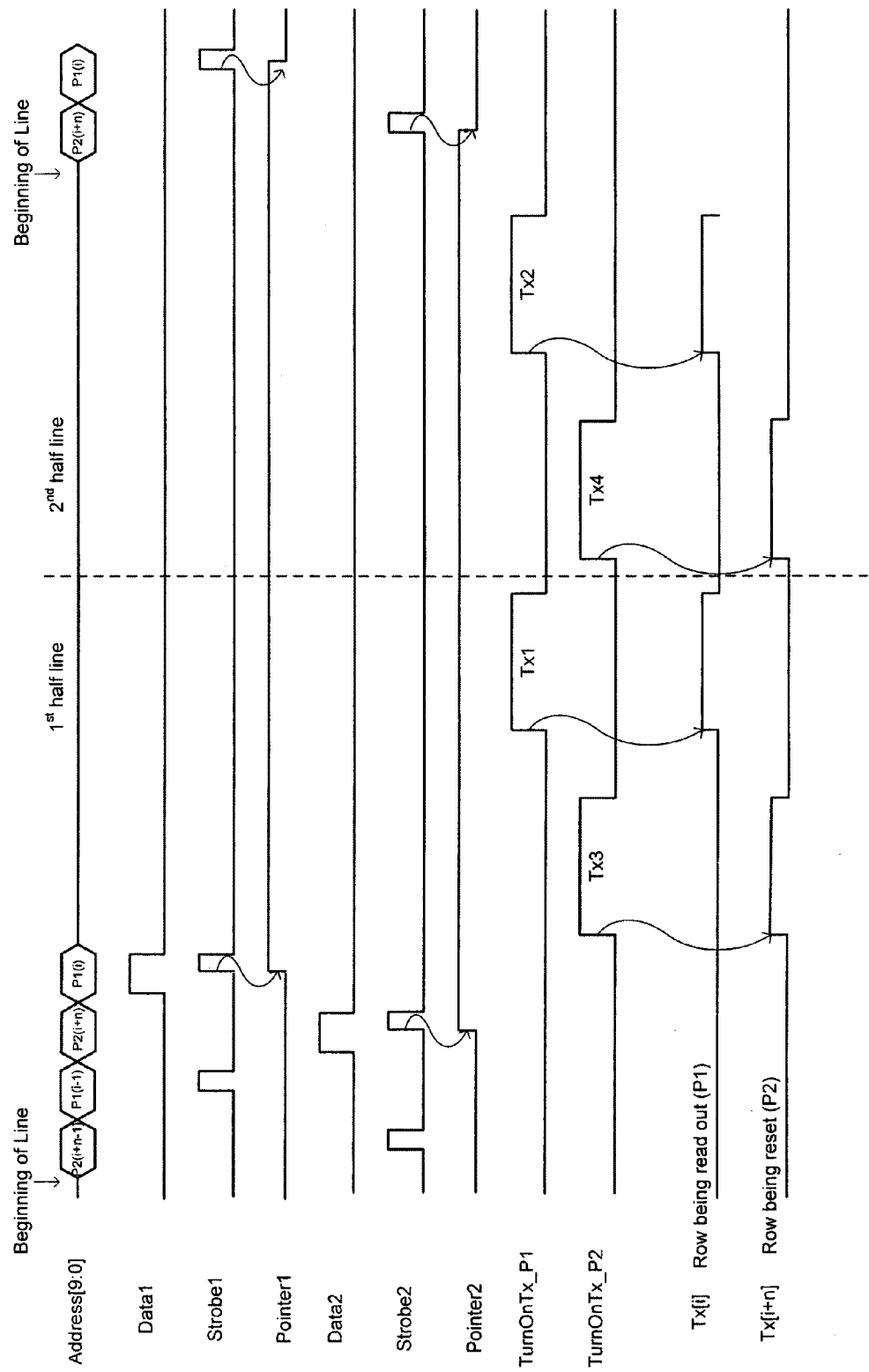
FIG. 5 is simplified timing diagram of the vertical read-out timing according to one embodiment of the invention.
Figure 11:
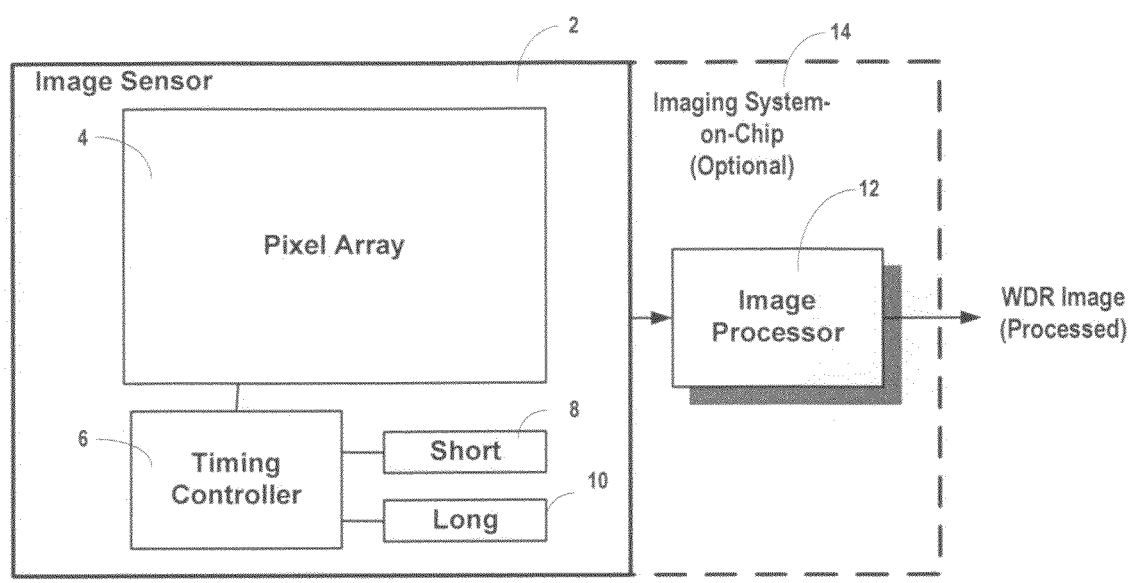
FIG. 11 is a simplified block diagram of a sensor system according to an embodiment of the present invention.

FIG. 11 illustrates a simplified block diagram of an image sensor and image sensor system according to an embodiment of the invention. An image sensor 2 includes a pixel array 4 and a timing controller 6. The timing controller provides the control signals to the pixel signal lines to cause the pixel signals to be read out from the pixel array, and also to reset the pixel half-rows. The timing controller may comprise, for example, the readout structure illustrated in FIG. 4, and operate according to the timing diagram illustrated in FIG. 5. The timing (and reset) controller may include programmable registers 8, 10 for programming the long and short integration intervals. The raw image data is then processed by an image processor 12, which combines the image information contained in the long integration pixels, with the image information contained in the short integration pixels (such as by interpolation, etc.) to form a single WDR procesed image, such as is shown in FIG. 8. The pixels are preferably processed one row at a time, but with the addition of a full or partial frame buffer, a larger image portion can be processed at once. The image processor may incorporate commercially avaialabe image processing software as is known in the art. Depending on the amount of digital circuit integration deemed suitable for the image sensor and the corresponding level of processing, the image processor can also be an additional image processor block of imaging System-on-Chip 14.

Figure 12:
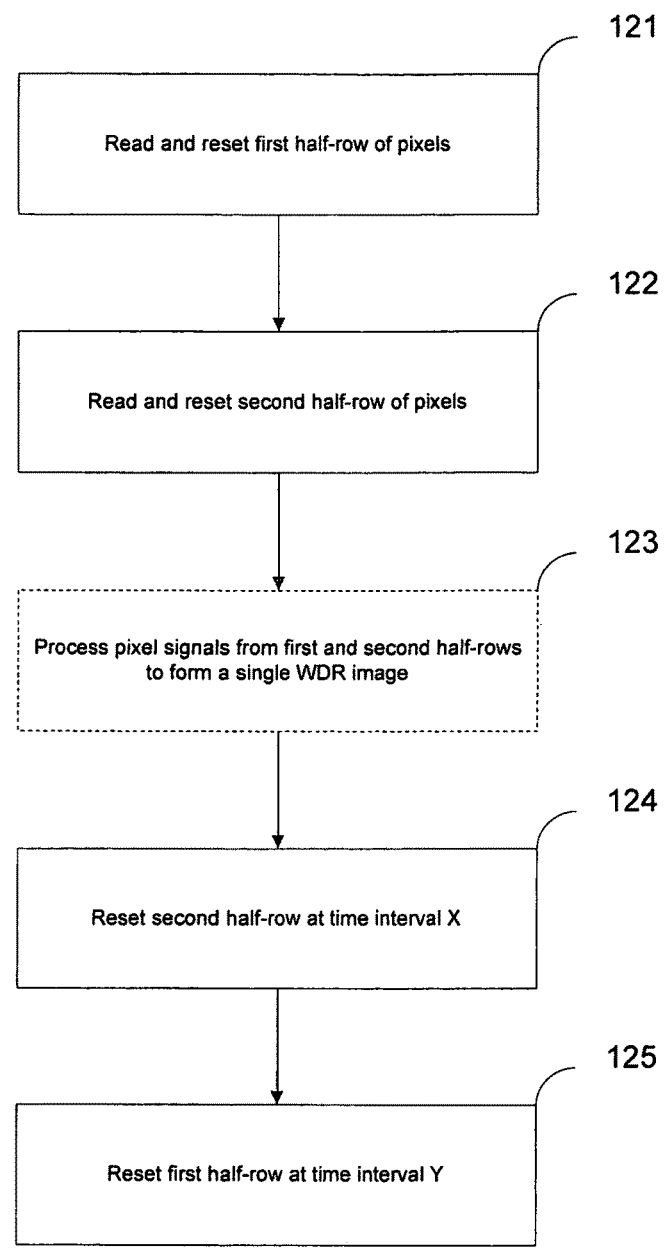
FIG. 12 is a flowchart of a method according to the present invention.

A flowchart illustrating a method according to the present invention is shown in FIG. 12. A first half-row is read and reset at step 121. Then, the second half-row is read and reset at step 122. The pixels from the first and second half-rows are processed (either during or after the read out process at step 123). The second half-row is then later reset at time interval X at step 124. The first half-row is then reset at time interval Y at step 125. This procedure is repeated for each row in the image sensor, and for video applications, the process continually runs until either the video camera or WDR feature is turned off.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. An image sensor comprising:
a plurality of pixel rows, each row comprising a plurality of pixels;
a first signal line connected to a first sub-set of pixels in a row;
a second signal line connected to a second sub-set of pixels in a row; and
a signal read out and reset timing controller connected to the first and second sub-set of pixels via the first and second signal lines, respectively, wherein the controller controls the read out of pixel signals such that signals from the first sub-set of pixels are read out during a first time period, and signals from the second sub-set of pixels are read out during a second time period; and wherein the controller resets the pixels in the first sub-set of pixels in a row at a first time interval, and resets the pixels in the second sub-set of pixels at a second time interval;
wherein the signal read out and reset timing controller adds additional row read out delay time at the end of each frame, in order to increase the second time interval beyond a normal time required to read one frame.

2. The image sensor of claim 1, wherein the second sub-set of pixels has a longer integration time than the first sub-set of pixels.

3. The image sensor of claim 1, wherein the second sub-set of pixels is reset before the first sub-set of pixels such that the second sub-set of pixels has a longer integration time than the first sub-set of pixels.

4. The image sensor of claim 1, wherein the first and second sub-set of pixels in each row are formed in an alternating pattern across each row of pixels in the image sensor.

5. The image sensor of claim 1, wherein the first and second sub-set of pixels are formed as N×M blocks of pixels, which alternate and repeat across at least a portion of the image sensor.

6. The image sensor of claim 1, wherein the first and second sub-set of pixels are formed as alternating Red and Green two pixel sets in a first row, and alternating Green and Blue two pixel sets in a second row.

7. The image sensor of claim 1, further comprising:
a 2×2 block of color filters formed over the pixels in the sensor, the 2×2 block of color filters comprising one Red, two Green and one Blue pixel, wherein the 2×2 block is repeated across the entire sensor.

8. The image sensor of claim 5, wherein the sensor comprises alternating 2×2 blocks of first sub-set pixels and second sub-set pixels, such that no two 2×2 blocks of first sub-set pixels are orthogonal another 2×2 block of first sub-set pixels.

9. The image sensor of claim 1, wherein the signal read out and reset timing controller comprises a first programmable integration time controller to set the first time interval, and a second programmable integration time controller to set the second time interval.

10. The image sensor of claim 1, wherein the first and second time intervals are adjusted by the controller to set a desired dynamic range of the image sensor.

11. An image sensor comprising:
a plurality of pixel rows, each row comprising a plurality of pixels,
a plurality of first signal lines equal to a number of pixels rows in the sensor, wherein each first signal line is connected to a first sub-set of pixels in one row of pixels;
a plurality of second signal lines equal to the number of pixel rows in the sensor, wherein each second signal line is connected to a second sub-set of pixels in one row of pixels; and
a timing controller connected to the plurality of first and second signal lines to control the read out of pixels on a row-by-row basis, wherein the first sub-set of pixels in a respective row is read out at a first time period, and the second sub-set of pixels is read out at a second time period following the first time period and before a next row is read out, and wherein the timing controller resets the pixels in the first sub-set of pixels in a respective row at a first integration start time interval and resets the second sub-set of pixels in a respective row at a second integration start time interval;
wherein the timing controller adds additional row read out delay time at the end of each frame, in order to increase the second time interval beyond a normal time required to read one frame.

12. The image sensor of claim 11, wherein the second sub-set of pixels is reset before the first sub-set of pixels such that the second sub-set of pixels has a longer integration time than the first sub-set of pixels.

13. The image sensor of claim 11, wherein the first and second sub-set of pixels in each row are formed in an alternating pattern across each row of pixels in the image sensor.

14. The image sensor of claim 11, wherein the first and second sub-set of pixels are formed as N×M blocks of pixels, which alternate and repeat across at least a portion of the image sensor.

15. The image sensor of claim 11, further comprising a color filter array formed over the pixels, wherein the first and second sub-set of pixels are formed as alternating Red and Green two pixel sets in a first row, and alternating Green and Blue two pixel sets in a second row.

16. The image sensor of claim 11, further comprising:
a 2×2 block of color filters formed over the pixels in the sensor, the 2×2 block of color filters comprising one Red, two Green and one Blue pixel, wherein the 2×2 block is repeated across the entire sensor.

17. The image sensor of claim 14, wherein the sensor comprises alternating 2×2 blocks of first sub-set pixels and second sub-set pixels, such that no two 2×2 blocks of first sub-set pixels are orthogonal to another 2×2 block of first sub-set pixels.

18. The image sensor of claim 11, wherein the timing controller comprises a first programmable integration time controller to set the first integration start time interval, and a second programmable integration time controller to set the second integration start time interval.

19. The image sensor of claim 11, wherein the first and second time intervals are adjusted by the timing controller to set a desired dynamic range of the image sensor.

20. The image sensor of claim 11, wherein the timing controller only reads out only one of the first and second sub-set of pixels to create a low resolution image.

21. The image sensor of claim 20, wherein the timing controller reads out both the first and second sub-set of pixels for only a portion of the image sensor to create a higher resolution image portion in an image.

22. A method for increasing the dynamic range of an image sensor, the image sensor comprising a plurality of pixel rows, each pixel row comprising a plurality of pixels, the method comprising:
reading out a first sub-set of pixels in a first row during a first time period;

reading out a second sub-set of pixels in the first row during a second time period, but before reading pixels from a next row;

resetting the pixels in the first sub-set of pixels after a first integration start time interval X;

resetting the pixels in the second subset of pixels after a second integration start time interval Y;

resetting the first sub-set of pixels initially after reading;

resetting the second sub-set of pixels initially after reading;

wherein either X or Y is equal to a time period greater than a time required to read out all rows in the image sensor, such that an integration time for pixels is greater than a normal frame period.

23. The method of claim 22, wherein the first integration start time interval X is equal to a time period to read out X rows of the sensor.

24. The method of claim 23, wherein the second integration start time interval Y is equal to a time period to read out Y rows of the sensor.

25. The method of claim 22, wherein X is greater than Y, such that the second sub-set of pixels has a longer signal integration time than the first sub-set of pixels.

26. The method of claim 22, wherein Y is greater than X, such that the first sub-set of pixels has a longer signal integration time than the second sub-set of pixels.

27. The method of claim 22, further comprising:

processing the pixel signals from the first and second sub-set of pixels from each row in the image sensor to form a single image.

28. An image sensor system comprising:

a plurality of pixel rows, each row comprising a plurality of pixels, a plurality of first signal lines equal to a number of pixels rows in the sensor, wherein each first signal line is connected to a first sub-set of pixels in one row of pixels;

a plurality of second signal lines equal to the number of pixel rows in the sensor, wherein each second signal line is connected to a second sub-set of pixels in one row of pixels;

a timing controller connected to the plurality of first and second signal lines to control the read out of pixel signals on a row-by-row basis, wherein the first sub-set of pixels in a respective row is read out at a first time period, and the second sub-set of pixels is read out at a second time period following the first time period and before a next row is read out, and wherein the timing controller resets the pixels in the first sub-set of pixels in a respective row at a first integration start time interval and resets the second sub-set of pixels in a respective row at a second integration start time interval; wherein the timing controller adds additional row read out delay time at the end of each frame, in order to increase the second time interval beyond a normal time required to read one frame; and an image processor to combine the pixel signals from the first and second sub-set of pixels.

* * * * *